(12) United States Patent
Maresh et al.

(10) Patent No.: US 11,120,118 B2
(45) Date of Patent: Sep. 14, 2021

(54) LOCATION VALIDATION FOR AUTHENTICATION

(71) Applicant: International Business Machines Corporation, Armonk, NY (US)

(72) Inventors: Mark E. Maresh, Wake Forest, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 15/820,802

(22) Filed: Nov. 22, 2017

(65) Prior Publication Data

US 2019/0156009 A1 May 23, 2019

(51) Int. Cl.
*G06F 21/36* (2013.01)
*H04L 29/06* (2006.01)

(52) U.S. Cl.
CPC .............. *G06F 21/36* (2013.01); *H04L 63/08* (2013.01); *H04L 63/107* (2013.01); *G06F 2221/2103* (2013.01); *G06F 2221/2111* (2013.01)

(58) Field of Classification Search
CPC ....... H04L 63/107; H04L 63/08; H04L 63/10; G06F 2221/2111; G06F 2221/2103; G06F 21/36; G06F 21/30; G06F 21/31
See application file for complete search history.

(56) References Cited

U.S. PATENT DOCUMENTS

| | | |
|---|---|---|
| 7,174,462 B2 | 2/2007 | Pering et al. |
| 7,522,182 B2 | 4/2009 | Bang |
| 8,090,945 B2 | 1/2012 | Singhal |
| 8,132,252 B2 | 3/2012 | Kernene |
| 8,176,159 B2 | 5/2012 | Kashi |
| 8,301,897 B2 | 10/2012 | Turner |
| 8,635,556 B2 | 1/2014 | Lalancette et al. |
| 8,803,980 B2 | 8/2014 | Klasssen et al. |
| 8,881,251 B1 | 11/2014 | Hilger |
| 8,918,851 B1 | 12/2014 | Iannamico |
| 9,313,439 B2 | 4/2016 | Lee et al. |

(Continued)

FOREIGN PATENT DOCUMENTS

WO 2013067122 A1 10/2013

*Primary Examiner* — Jung W Kim
*Assistant Examiner* — Adrian Stoica
(74) *Attorney, Agent, or Firm* — Cantor Colburn LLP; Tihon Poltavets (57) ABSTRACT

Examples of techniques for location validation for authentication are disclosed. In one example implementation according to aspects of the present disclosure, a computer-implemented method includes presenting, by a processing device, a location-based security challenge to a user. The method further includes responsive to presenting the location-based security challenge to the user, receiving, by the processing device, media from the user. The method further includes validating, by the processing device, the media received from the user against the location-based security challenge to determine whether the user is located at an authorized location. The method further includes responsive to determining that the user is located at an authorized location, authenticating, by the processing device, the user to grant access for the user to a resource.

14 Claims, 6 Drawing Sheets

(56) References Cited

U.S. PATENT DOCUMENTS

| | | |
|---|---|---|
| 2004/0203863 A1 | 10/2004 | Huomo |
| 2004/0230843 A1 | 11/2004 | Jansen |
| 2006/0142027 A1 | 6/2006 | Krishnamurthi et al. |
| 2008/0147546 A1 | 6/2008 | Weichselbaumer et al. |
| 2008/0222038 A1 | 9/2008 | Eden et al. |
| 2008/0226130 A1* | 9/2008 | Kansal .................. G01C 21/20 382/106 |
| 2009/0232351 A1 | 9/2009 | Kagitani et al. |
| 2012/0192252 A1* | 7/2012 | Kuo ........................ G06F 21/31 726/4 |
| 2013/0036461 A1* | 2/2013 | Lowry .................... G06F 21/36 726/19 |
| 2013/0090086 A1 | 4/2013 | Lopez Lopez |
| 2016/0179070 A1 | 6/2016 | Hwang et al. |
| 2016/0248784 A1* | 8/2016 | Kimura .................. G06F 21/36 |
| 2016/0306994 A1* | 10/2016 | Olsen-Kreusch ..... G06F 21/602 |
| 2017/0289119 A1* | 10/2017 | Lauer ..................... H04W 12/06 |
| 2018/0063125 A1* | 3/2018 | Bryant .............. H04W 12/0804 |
| 2018/0234420 A1* | 8/2018 | Mattes ............... G06K 9/00892 |

\* cited by examiner

LOCATION VALIDATION FOR AUTHENTICATION

BACKGROUND

The present invention generally relates to processing systems, and more specifically, to location validation for authentication.

Processing systems can be used to access secure or protected data. In order to access the secure or protected data, a user may be required to authenticate itself in order to be granted access. For example, the user enters a username and password to gain access to a secure portion of a website. Basic username and password authentication is common and easy to implement but can also be less secure than other authentication techniques. Some websites, applications, data stores, etc., may implement more advanced authentication techniques. For example, a financial institution, an online medical chart, can require multiple levels of authentication (i.e., multi-factor authentication) for a user to access secure or protected data. Multi-factor authentication requires that a user present multiple separate pieces of evidence to gain access to secure or protected data.

SUMMARY

Embodiments of the present invention are directed to a computer-implemented method for location validation for authentication. A non-limiting example of the computer-implemented method includes presenting, by a processing device, a location-based security challenge to a user. The method further includes responsive to presenting the location-based security challenge to the user, receiving, by the processing device, media from the user. The method further includes validating, by the processing device, the media received from the user against the location-based security challenge to determine whether the user is located at an authorized location. The method further includes responsive to determining that the user is located at an authorized location, authenticating, by the processing device, the user to grant access for the user to a resource.

Embodiments of the present invention are directed to a system for location validation for authentication. A non-limiting example of the system includes a memory comprising computer readable instructions and a processing device for executing the computer readable instructions for performing a method. A non-limiting example of the method includes presenting, by a processing device, a location-based security challenge to a user. The method further includes responsive to presenting the location-based security challenge to the user, receiving, by the processing device, media from the user. The method further includes validating, by the processing device, the media received from the user against the location-based security challenge to determine whether the user is located at an authorized location. The method further includes responsive to determining that the user is located at an authorized location, authenticating, by the processing device, the user to grant access for the user to a resource.

Embodiments of the invention are directed to a computer program product for location validation for authentication, the computer program product comprising a computer readable storage medium having program instructions embodied therewith. The program instructions are executable by a processor to cause the processor to perform a method. A non-limiting example of the method includes presenting, by a processing device, a location-based security challenge to a user. The method further includes responsive to presenting the location-based security challenge to the user, receiving, by the processing device, media from the user. The method further includes validating, by the processing device, the media received from the user against the location-based security challenge to determine whether the user is located at an authorized location. The method further includes responsive to determining that the user is located at an authorized location, authenticating, by the processing device, the user to grant access for the user to a resource.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
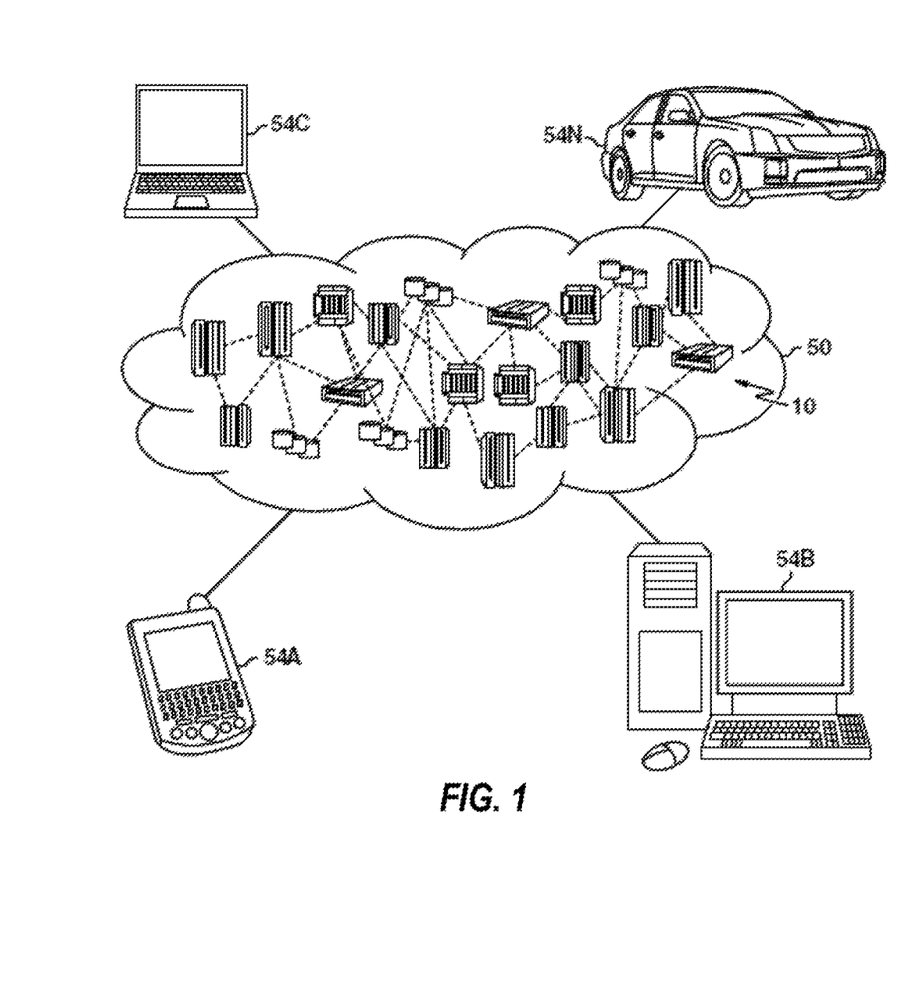
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
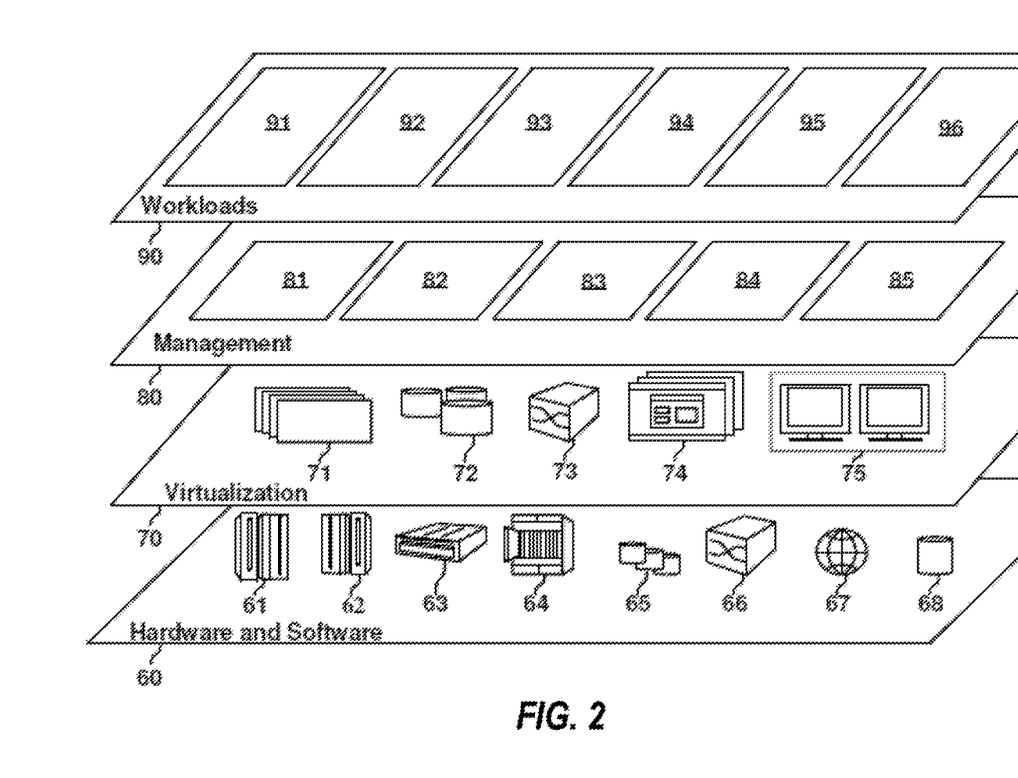
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and location validation for authentication 96.

Figure 3:
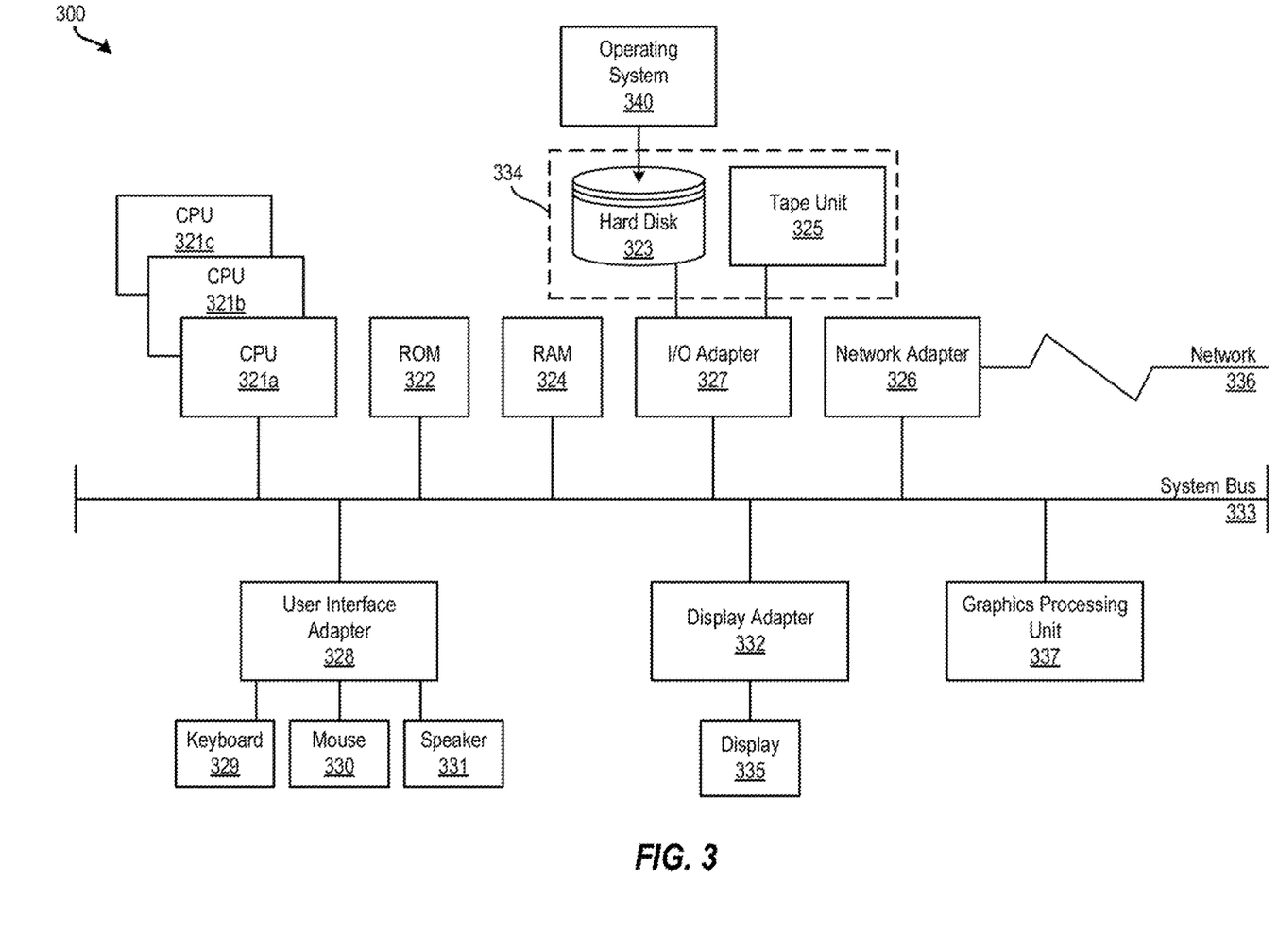
FIG. 3 depicts a block diagram of a processing system for implementing the techniques described herein according to aspects of the present disclosure.

It is understood in advance that the present disclosure is capable of being implemented in conjunction with any other type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the present disclosure, techniques for location validation for authentication are provided. Some authentication techniques, such as multi-factor authentication, utilize a user's location to authenticate the user. Authentication techniques that use a user's location for authentication enable a system to restrict access or usage of that system (or to data) from a specific user designated location or locations by validating the location of the user. Existing location-based authentication can use global positioning system (GPS) information or other location data to validate a user's location.

Other authentication techniques use images to authenticate a user. For example, some authentication techniques present an image or images to a user and require that the user select the correct image, images, order of images, etc., in order to be authenticated. However, none of these existing techniques enable location validation by enabling a user to provide media (e.g., an image, images, video, etc.) of a location or locations to satisfy authentication requirements.

Turning now to an overview of the aspects of the invention, one or more embodiments of the invention address the above-described shortcomings of the prior art by providing location validation for authentication using user-provided media. In particular, the present techniques provide system or data access by requiring a user to validate his location by providing media to prompts/challenges that are predefined by the user and can be cryptic or increased security. To configure the system, the user provides a series of reference media from a specified location and corresponding descriptions of the media to the system. During authentication/validation of the specific location, the system presents the descriptions of the media to the user, and the user must capture new media that corresponds to the descriptions. The user then provides the media to the system for validation. Using a validation algorithm, the system verifies that the media provided by the user correspond to the reference media. For example, the system may verify that the media provided by the user are provided in an order that corresponds to an order of the descriptions presented to the user. As used herein, presenting the descriptions can be referred to as presenting a location-based security challenge. The authentication for granting access to a resource can also include accessing the actual resource by the user or otherwise making the resource available to the user.

This provides a number of advantages. For example, the present techniques provide a highly secure authentication technique when using cryptic image descriptions for the authentication challenge. These techniques also prevent access from non-authorized locations. Although the present techniques are discussed above with respect to multi-factor authentication, the present techniques can also be used for individual or sole authentication.

Example embodiments of the disclosure include or yield various technical features, technical effects, and/or improvements to technology. Example embodiments of the disclosure provide enhanced processing system and data security by using location validation for authentication to restricted resources by presenting a user with a location-based security challenge, receiving media from the user responsive to the location-based security challenge, and validating the media received from the user against the location-based security challenge to determine whether the user is located at an authorized location. These aspects of the disclosure constitute technical features that yield the technical effect grating the user access to a restricted resource when it is determined that the user is at an authorized location. Accordingly, unauthorized access can be reduced, thereby improving computing systems by providing heightened security. As a result of these technical features and technical effects, a system in accordance with example embodiments of the disclosure represents an improvement to existing system and data security techniques. Moreover, the techniques described herein use less processing resources, power resources, network resources, and/or memory resources by using image comparison instead of relying on GPS data to perform location-based validation. It should be appreciated that the above examples of technical features, technical effects, and improvements to technology of example embodiments of the disclosure are merely illustrative and not exhaustive.

Figure 4:
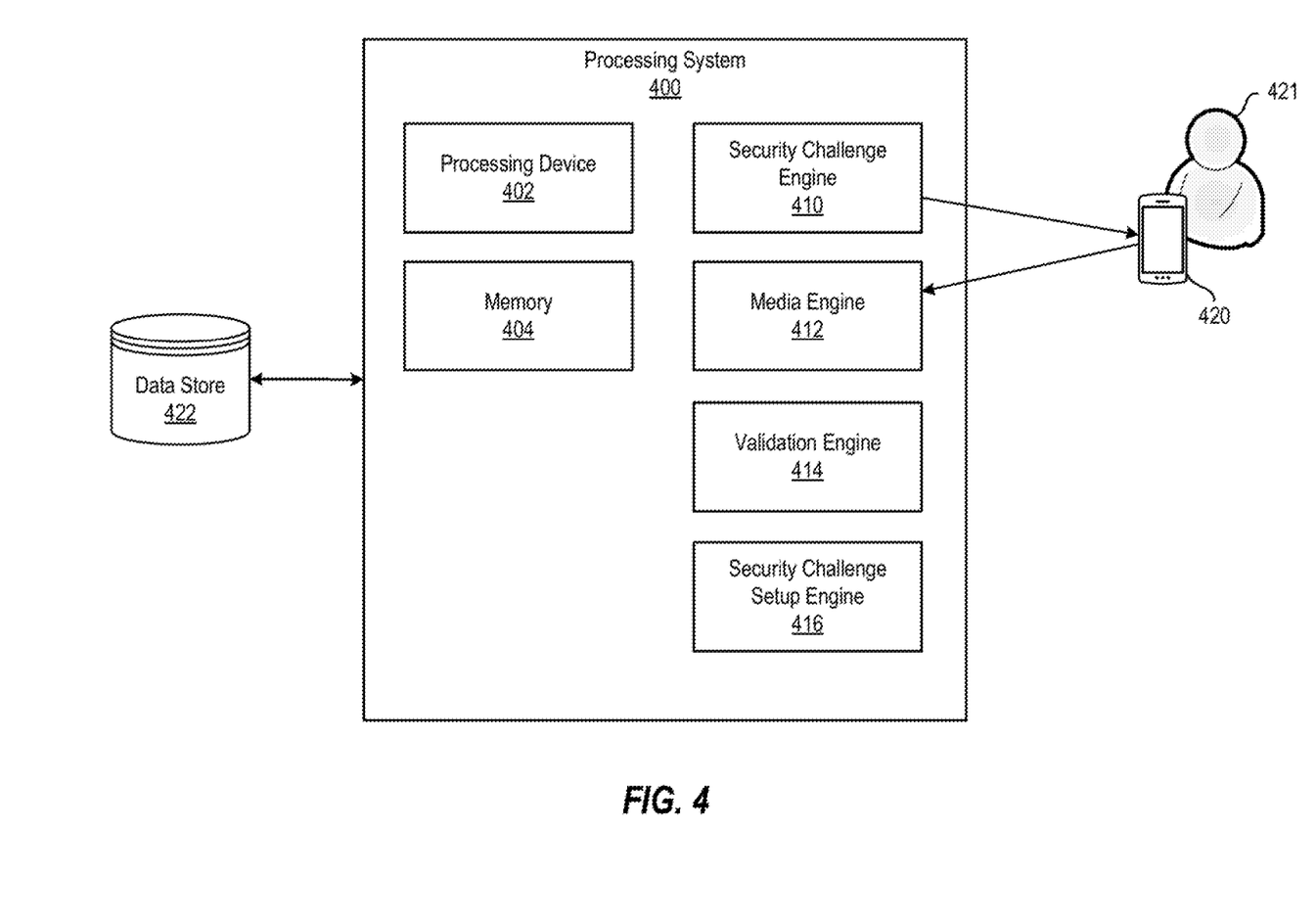
FIG. 4 depicts a block diagram of a processing system for location validation for authentication, according to aspects of the present disclosure.

FIG. 4 depicts a block diagram of a processing system 400 for location validation for authentication, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a security challenge engine 410, a media engine 412, and a validation engine 414. The security challenge engine 410 issues a security challenge to a user device 420 associated with a user 421.

The security challenge prompts the user to provide media (e.g., a photograph, a video, etc.) that can be used to authenticate the user 421 and the user device 420 to enable the user to access a restricted resource (e.g., a processing system, data, etc.). The security challenge is location-based, which means that the security challenge requests that the user 421 provide verification of the user's location in order to access the restricted resource. This prevents the user 421 from accessing the restricted resource when the user is in a non-verified location.

According to aspects of the present disclosure, the processing system 400 can also include a security challenge setup engine 416 that enables the user 421 to perform an initial setup of the security challenge. The security challenge can be set up using the security challenge setup engine 416, which enables the user 421 to set location-based security challenges by providing a text description of an object that is expected to be at a specified location within a proximity (e.g., within a certain range) to the user 421. For example, the user can provide several pictures and/or videos of an object in the user's residence, such as a chair in the user's office, a window in the user's kitchen, an artificial plant, a coffee mug, etc., to enable the user 421 to access the restricted resource from the user's residence.

The security challenge can request that the user 421 sends media of a particular object (e.g., a desk, a lamp, a doorway, a coffee mug, etc.) that is associated with a trusted location for the user. The user 421 uses the user device 420 (or another suitable device) to capture media, such as a picture, video, etc. of the particular object associated with the trusted location and transmit the media to the processing system 400. The media engine 412 receives the media from the user device 420 associated with the user 421.

The validation engine 414 uses the received media to validate the location of the user 421 against the location-based security challenge to determine whether the user 421 is located at an authorized location. For example, the validation engine 414 can validate the media received from the user 421 against stored media previously provided by the user 421 to determine whether the user 421 is located in an authorized location. The media previously provided by the user can be stored in any suitable repository, such as the data store 422, which can be integrated into the processing system 400 and/or accessible by the processing system 400, such as over a network.

According to aspects of the present disclosure, the validation engine 414 determines a similarity between the media received from the user 421 and the stored media previously provided by the user 421. In an example, when the similarity is less than a first threshold, the validation fails, and the user 421 is denied access to the restricted resource. However, when the similarity is greater than the second threshold, the validation passes, and the user 421 is granted access (i.e., the user is authenticated). In another example, when the similarity is between a first threshold and a second threshold, the user is authenticated, but when the similarity is less than the first threshold or greater than the second threshold, the user is not authenticated. This scenario prevents a user from submitting an exact copy of media (e.g., a previously taken picture or video) to add additional security. According to additional aspects of the present disclosure, the validation engine 414 can also grant access to the restricted resource to enable the user 421 to access the restricted resource.

Figure 5:
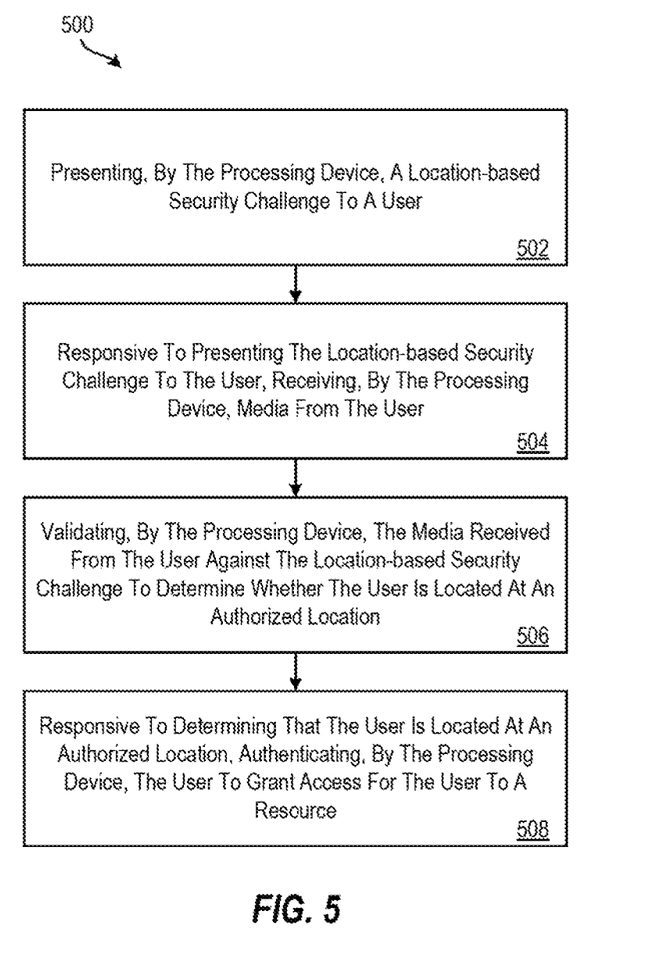
FIG. 5 illustrates a flow diagram of a method for location validation for authentication, according to examples of the present disclosure.

FIG. 5 illustrates a flow diagram of a method 500 for location validation for authentication, according to examples of the present disclosure. The method 500 can be implemented by any suitable processing system or processing device, such as the cloud computing environment 50, the processing system 300, the processing system 400, or any other suitable processing system or processing device.

At block 502, the security challenge engine 410 presents a location-based security challenge to the user 421. According to aspects of the present disclosure, the location-based security challenge is a text description of an object that is expected to be at a specified location within a proximity to the user 421 or visible to the user 421. In some examples, the location-based security challenge is presented to the user 421 responsive to the user 421 requesting access to a restricted resource At block 504, responsive to presenting the location-based security challenge to the user 421, the media engine 412 receives media from the user device 420 associated with the user 421. The media can be an image or images, a video or videos, and the like. For example, the user 421 can take an image with a camera of the user device 420.

At block 506, the validation engine 414 validates the media received from the user 421 against the location-based security challenge to determine whether the user 421 is located at an authorized location. The validating can include comparing the media received from the user 421 against stored media previously provided by the user 421. For example, it is determined that the user 421 is located at an authorized location when a similarity between the media received from the user 421 and the stored media previously provided by the user 421 is greater than a first threshold. However, in this example, it is determined that the user 421 is not located at an authorized location when a similarity between the media received from the user 421 and the stored media previously provided by the user 421 is less than a first threshold.

In another example, it is determined that the user 421 is not located at an authorized location when a similarity between the media received from the user 421 and the stored media previously provided by the user 421 is less than a first threshold. However, in this example, it is determined that the user 421 is not located at an authorized location when a similarity between the media received from the user 421 and the stored media previously provided by the user 421 is less than a first threshold or greater than a second threshold.

In yet another example where the media includes a plurality of images, the validating the media received from the user 421 against the location-based security challenge includes comparing an order that the plurality of images was received against an expected order for the plurality of images. This provides an added level of security by requiring the user 421 to know what order in which to submit the images. If the images are provided in an incorrect order, the user 421 is not authenticated.

At block 508, when it is determined that the user 421 is located at an authorized location, the user is authenticated such that the user 421 is granted access to a restricted resource. This can include authorizing the user to access restricted data, a restricted processing system, or another restricted resource.

Additional processes also may be included, and it should be understood that the processes depicted in FIG. 5 represent illustrations and that other processes may be added or existing processes may be removed, modified, or rearranged without departing from the scope and spirit of the present disclosure.

Figure 6:
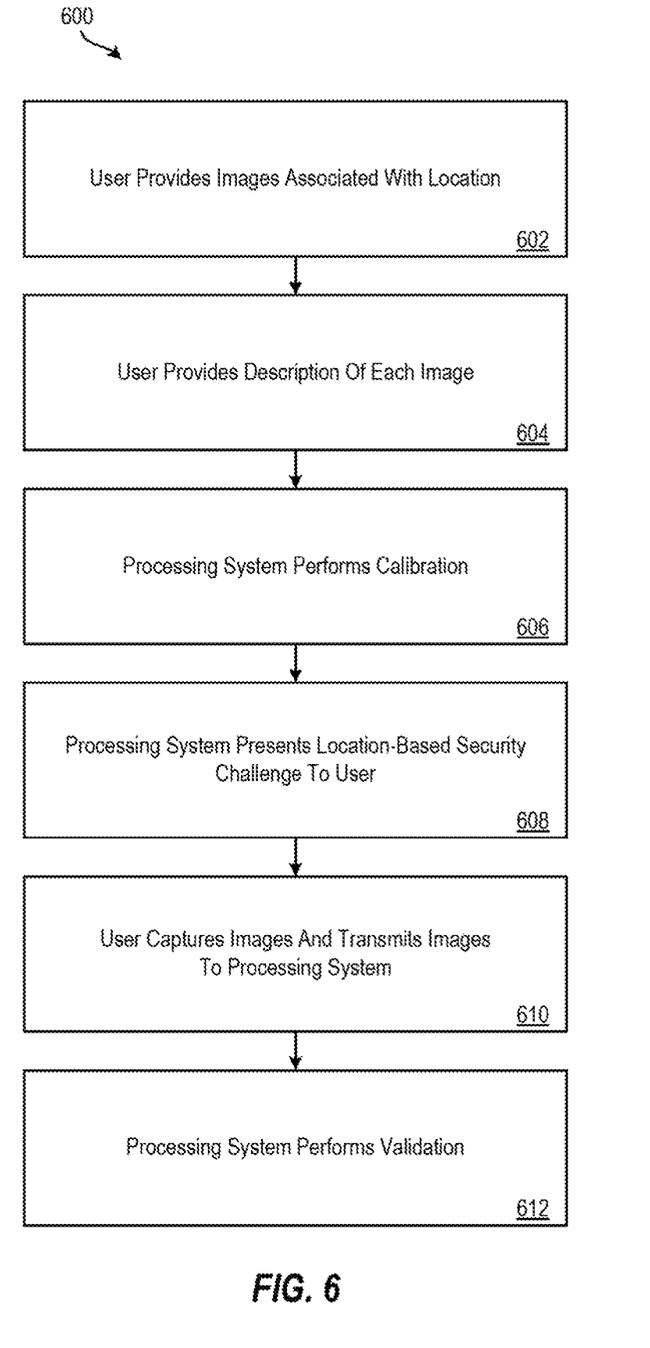
FIG. 6 illustrates a flow diagram of a method for location validation for authentication, according to examples of the present disclosure.

FIG. 6 illustrates a flow diagram of a method 600 for location validation for authentication, according to examples of the present disclosure. The method 600 can be implemented by any suitable processing system or processing device, such as the cloud computing environment 50, the processing system 300, the processing system 400, or any other suitable processing system or processing device.

Setup begins at block 602, where the user 421 provides images associated with a location to the media engine 412 to be used by the security challenge setup engine 416. The number of images can be increased for increased security (e.g., 10 images are more secure than 4 images). The user 421 can capture images of objects (e.g., radiator, door, window, floor, lights, desk, chair, computer, picture, air vent, etc.) and/or images of the user (e.g., the user's hands, the user's feet, the user's face, etc.). The descriptions can be cryptic, such as "my favorite item in the office is" to increase security. At block 604, the user 421 provides a description of each of the images. Additionally, "dummy" or placeholder descriptions, with no associated image, can also be added for enhanced security. The descriptions form the location-based security challenge. At block 606, the processing system 400 performs calibration of the setup by running a number of trial runs to calibrate the expected time required for the user to complete the image capture. The expected time can be used as an additional criterion for validation (e.g., if the user 421 fails to provide the proper images in the time period, validation fails). Setup is then complete.

At block 608, the processing system 400 presents location-based security challenge (e.g., descriptions of the images) to the user 421. The images are presented in a random or predefined order, for example. At block 610, the user 421 captures images and transmits the images to the processing system 400. Images can be captured as part of a video sequence or as still images. At block 612, the processing system 400 performs validation. For example, the validation engine 414 verifies that the images received from the user 421 are in a correct sequence and match the reference images stored in the data store 422. If the images are provided as part of a video sequence, the processing system 400 can confirm that video frames of the images expected are contained in the video sequence. If the image is an exact match to the reference image (e.g., a 100% correlation), the processing system 400 can reject the image as invalid or require an additional level of authentication. An image correlation criteria range can be set between a first (min) threshold and a second (max) threshold to allow for variations in image capture conditions and equipment (e.g., 85% to 98%). If the time taken by the user 421 to provide the images to the processing system 400 exceeds the trial-run time, the system can require further authentication or reject the user access. If an image is provided in response to a dummy or placeholder image, the system rejects the user's access.

Additional processes also may be included, and it should be understood that the processes depicted in FIG. 6 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for location validation for authentication, the method comprising:
   receiving, by a processing device from a user, a reference media for use in a location-based security challenge and a text description of an object depicted in the reference media, wherein the reference media comprises a plurality of images in an expected order;
   presenting, by the processing device, the location-based security challenge to the user, wherein the location-based security challenge includes the text description of the object;
   responsive to presenting the location-based security challenge to the user, receiving, by the processing device, media from the user, wherein the media comprises a plurality of images in a sequence and wherein the plurality of images were captured by the user in response to the location-based security challenge;
   validating, by the processing device, the media received from the user against the location-based security challenge to determine whether the user is located at an authorized location, wherein validating the media received from the user against the location-based security challenge comprises verifying that the media received from the user matches the reference media and verifying that the sequence of the plurality of images of the media matches the expected order and wherein the plurality of images includes at least two images; and
   responsive to determining that the user is located at an authorized location, authenticating, by the processing device, the user to grant access for the user to a resource.

2. The computer-implemented method of claim 1, wherein the media is at least one video.

3. The computer-implemented method of claim 1, wherein it is determined that the user is located at an authorized location when a similarity between the media received from the user and the reference media previously provided by the user is greater than a first threshold.

4. The computer-implemented method of claim 1, wherein it is determined that the user is located at an authorized location when a similarity between the media received from the user and the reference media previously provided by the user is greater than a first threshold and less than a second threshold.

5. The computer-implemented method of claim 1, wherein it is determined that the user is not located at an authorized location when a similarity between the media received from the user and the stored reference media previously provided by the user is less than a first threshold.

6. The computer-implemented method of claim 1, wherein it is determined that the user is not located at an authorized location when a similarity between the media received from the user and the reference media previously provided by the user is less than a first threshold or greater than a second threshold.

7. The computer-implemented method of claim 1, wherein the location-based security challenge is presented to the user responsive to the user requesting access to a restricted resource.

8. A system for location validation for authentication, the system comprising:
   a memory comprising computer readable instructions; and
   a processing device for executing the computer readable instructions for performing a method, the method comprising:
   presenting, by the processing device, a location-based security challenge to a user, wherein the location-based security challenge is a text description of an object that is expected to be at a specified location within a proximity to the user, wherein the text description of the object was previously provided by the user, and wherein the object is depicted in reference media comprising a plurality of images in an expected order;
   responsive to presenting the location-based security challenge to the user, receiving, by the processing device, media from the user, wherein the media comprises a plurality of images in a sequence and wherein the plurality of images were captured by the user in response to the location-based security challenge;

validating, by the processing device, the media received from the user against the location-based security challenge to determine whether the user is located at an authorized location; and responsive to determining that the user is located at an authorized location, authenticating, by the processing device, the user to grant access for the user to a resource, wherein validating the media received from the user against the location-based security challenge comprises verifying that the media received from the user matches the reference media and verifying that the sequence of the plurality of images of the media matches the expected order and wherein the plurality of images includes at least two images.

9. The system of claim 8, wherein the media is at least one video.

10. The system of claim 8, wherein it is determined that the user is located at an authorized location when a similarity between the media received from the user and the reference media previously provided by the user is greater than a first threshold.

11. The system of claim 8, wherein it is determined that the user is located at an authorized location when a similarity between the media received from the user and the reference media previously provided by the user is greater than a first threshold and less than a second threshold.

12. The system of claim 8, wherein it is determined that the user is not located at an authorized location when a similarity between the media received from the user and the reference media previously provided by the user is less than a first threshold.

13. The system of claim 8, wherein it is determined that the user is not located at an authorized location when a similarity between the media received from the user and the reference media previously provided by the user is less than a first threshold or greater than a second threshold.

14. A computer program product for location validation for authentication, the computer program product comprising:

a computer readable storage medium having program instructions embodied therewith, the program instructions executable by a processing device to cause the processing device to perform a method comprising:

presenting, by the processing device, a location-based security challenge to a user, wherein the location-based security challenge is a text description of an object that is expected to be at a specified location within a proximity to the user and wherein the text description of the object and reference media depicting the object were previously provided by the user, wherein the reference media comprises a plurality of images in an expected order;

responsive to presenting the location-based security challenge to the user, receiving, by the processing device, media from the user, wherein the media comprises a plurality of images in a sequence and wherein the plurality of images were captured by the user in response to the location-based security challenge;

validating, by the processing device, the media received from the user against the location-based security challenge to determine whether the user is located at an authorized location; and responsive to determining that the user is located at an authorized location, authenticating, by the processing device, the user to grant access for the user to a resource, wherein validating the media received from the user against the location-based security challenge comprises verifying that the media received from the user matches the reference media and verifying that the sequence of the plurality of images of the media matches the expected order and wherein the plurality of images includes at least two images.

* * * * *